(12) United States Patent
Pehrson et al.

(10) Patent No.: US 8,708,031 B2
(45) Date of Patent: Apr. 29, 2014

(54) METHOD AND MOLD FOR CASTING THIN METAL OBJECTS

(71) Applicant: Babcock & Wilcox Technical Services Y-12, LLC, Oak Ridge, TN (US)

(72) Inventors: Brandon P. Pehrson, Harriman, TN (US); Alan F. Moore, Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 0 days.

(21) Appl. No.: 13/626,203

(22) Filed: Sep. 25, 2012

(65) Prior Publication Data

US 2014/0083643 A1    Mar. 27, 2014

(51) Int. Cl.
*B22C 9/06* (2006.01)
*B22D 33/04* (2006.01)

(52) U.S. Cl.
USPC ............ 164/339; 164/341; 164/342; 164/137

(58) Field of Classification Search
USPC ........... 164/137, 339, 341, 342; 249/160–172
See application file for complete search history.

(56) References Cited

U.S. PATENT DOCUMENTS 6,598,661 B2 * 7/2003 Schwenecke ................. 164/418

FOREIGN PATENT DOCUMENTS

JP        2011173165 A  *  9/2011

* cited by examiner

*Primary Examiner* — Kevin P Kerns
*Assistant Examiner* — Kevin E Yoon
(74) *Attorney, Agent, or Firm* — Michael J. Renner, Esq.; Luedeka Neely Group, P.C.

(57) ABSTRACT

Provided herein are various embodiments of systems for casting thin metal plates and sheets. Typical embodiments include layers of mold cavities that are oriented vertically for casting the metal plates. In some embodiments, the mold cavities include a beveled edge such that the plates that are cast have a beveled edge. In some embodiments, the mold cavities are filled with a molten metal through an open horizontal edge of the cavity. In some embodiments, the mold cavities are filled through one or more vertical feed orifices. Further disclosed are methods for forming a thin cast metal plate or sheet where the thickness of the cast part is in a range from 0.005 inches to 0.2 inches, and the surface area of the cast part is in a range from 16 square inches to 144 square inches.

13 Claims, 8 Drawing Sheets

METHOD AND MOLD FOR CASTING THIN METAL OBJECTS

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

This disclosure relates to the field of metal casting. More particularly, this disclosure relates to casting thin metal sheets.

BACKGROUND

The production of metal coupons and plates is necessary for many industrial applications. One important application is the manufacture of plates of fissile material that are to be subjected to rolling operations in order to create foils for use as nuclear reactor fuel elements. Traditional methods for manufacturing such metal plates include the steps of: casting an ingot, applying a thermal (softening) treatment, rolling the ingot with a break-down mill (to a thickness suitable for feeding a foil mill), annealing the rolled plate, and cutting the plate into coupons that can be used to feed a foil mill. In such processes, it is desirable to begin with very thin castings in order to minimize the amount of rolling operations that must be performed on the castings. For many applications it would be desirable to cast metals as sheets that have a thickness that is less than 0.020 inches. Historically, the casting of such thin metal sheets has been difficult. When traditional casting processes are applied to the casting of thin metal sheets, the resulting sheets often have unacceptable quality defects. For example, the resultant castings often have excessive porosity, and/or have incomplete extension (i.e., the molten metal solidifies before filling the mold cavity), and/or have cold shunts (i.e., areas where two or more portions of the molten metal have flowed together but did not fuse together before solidifying). When thicker castings are used, rolling operations often result in "alligatoring" (sometimes referred to as "fish-mouthing"), which refers to a splitting of an edge of a rolled metal slab in which the plane of the split is parallel to the rolled surface. What is needed therefore are improved methods for casting thin metal plates and sheets that may be more productively used in subsequent rolling operations.

SUMMARY

In one embodiment, the present disclosure provides a first mold backing structure that has a first mold backing structure plate. The first mold backing structure plate forms a first mold cavity first planar surface. The first mold backing structure also has a first mold cavity first framing portion that forms a first mold backing structure first surface and a first mold cavity first edge portion. Typically, at least a portion of the first mold cavity first edge portion is a first beveled edge. Such embodiments typically further include a first mold facing structure that has a first mold cavity second planar surface. Typically, the first mold backing structure first surface is removably attachable to the first mold cavity second planar surface. Such embodiments further typically include a means for removably attaching the first mold backing structure first surface to the first mold cavity second planar surface. Generally, when the first mold backing structure first surface is attached to the first mold cavity second planar surface, then the combination of the first mold cavity first planar surface, the first mold cavity second planar surface, and the first mold cavity first edge portion form a first mold cavity and a first horizontal open edge for providing a flow of a molten metal into the first mold cavity.

In another embodiment, a metal casting system has a first mold backing structure, and the first mold backing structure includes a first mold backing structure plate that forms a first mold cavity first planar surface. In certain embodiments, the first mold backing structure also has a first mold cavity first framing portion that forms a first mold backing structure first surface and a first mold cavity first edge portion. Generally, such embodiments further include a first means for removably attaching the first mold backing structure first surface to a first mold cavity second planar surface of a first mold facing structure. These embodiments generally further include a distributor that is removably attachable to the first mold backing structure and the first mold facing structure. Further, a second means is provided for removably attaching the distributor to the first mold backing structure and the first mold facing structure. In these embodiments, when the first mold backing structure first surface is attached to the first mold cavity second planar surface, and when the distributor is attached to the first mold backing structure and to the first mold facing structure, the distributor forms a first mold cavity second edge portion. Furthermore, the combination of the first mold cavity first planar surface, the first mold cavity first edge portion, the first mold cavity second planar surface, and the first mold cavity second edge portion form a first mold cavity. Then a first vertical feed orifice is provided through the distributor for providing a flow of a molten metal into the first mold cavity.

Further disclosed are methods for forming a cast metal sheet having a thickness ratio between about 0.000035 in./sq. in. and about 0.005 in./sq. in. Typically, methods include melting a solid metal having a melting temperature to form a molten metal, and preheating a mold having a cavity with a thickness ratio between about 0.000035 in./sq. in. and about 0.005 in./sq. in. to a temperature greater than the melting temperature of the metal. Then, typically, the molten metal is flowed into the cavity. The method proceeds with cooling the molten metal to a temperature below the melting temperature of the metal to form the cast metal sheet and then removing the cast metal sheet from the mold.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of metal casting systems. It is to be understood that other embodiments may be utilized, and that structural changes may be made and processes may vary in other embodiments.

Disclosed herein are various embodiments of casting systems that may be used to cast thin metal plates and sheets. Plates and sheets are materials that have widths and lengths that are at least an order of magnitude greater than their thickness. For purposes of discussion herein, the distinction between what is considered to be a "plate" and what is considered to be a "sheet" is that plates are considered to be materials that have a thickness of at least 0.020 inches whereas sheets are materials that have a thickness that is less than 0.020 inches. Typically the manufacturing tolerance on these parts is about +/−0.002 inches, so when a thickness of a plate or a sheet is stated as being "about" a particular dimensional value, that tolerance is implied.

In preferred embodiments the casting systems are used in a furnace such that an appropriate thermal profile may be applied throughout the casting system. For example, the casting system may be fabricated from structures that include susceptors of microwaves, such that the casting system may be disposed in a microwave furnace and microwave energy may be used to heat the casting system. A casting system fabricated from graphite for use in a microwave furnace is an example of such a system.

Typically, various embodiments disclosed herein will reduce or potentially eliminate the need for break-down rolling, thermal treatments, and cutting of metal plates or sheets. The reduction or elimination of these steps greatly reduces the complexity, size, and processing time required to prepare plates or sheets for foil rolling. The casting of thin plates or sheets also increases manufacturing efficiency by reducing scrap generation. Using embodiments disclosed herein, metal test coupons have been cast over a range between thicknesses from about 0.005 inches thick to about 0.2 inches thick, although smaller thicknesses are believed possible.

Figure 1A:
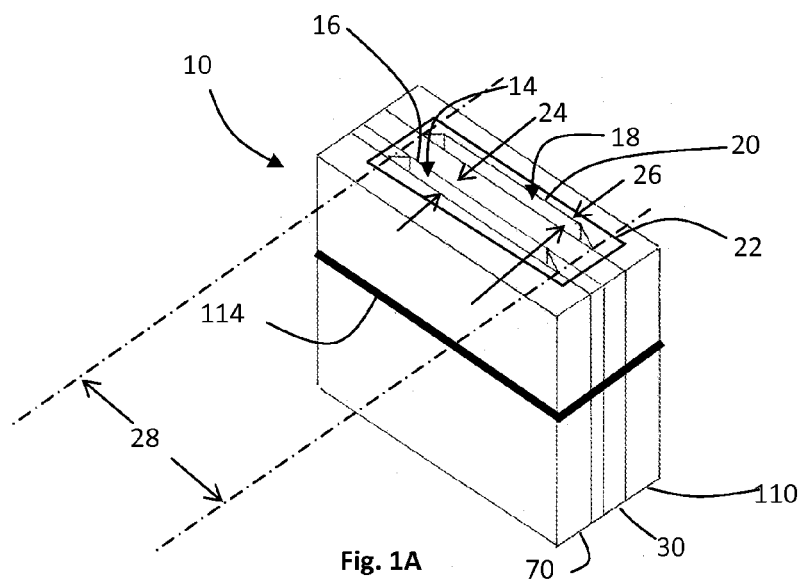
FIG. 1A is an isometric view of a metal casting system.

FIG. 1A illustrates a metal casting system 10. The metal casting system 10 has a first mold cavity 14 and a second mold cavity 18. The first mold cavity 14 has a first open edge 16 and the second mold cavity 18 has a second open edge 20. As shown, the open edges 16 and 20 are typically horizontal. In the embodiment of FIG. 1A, the first horizontal open edge 16 and the second horizontal open edge 20 each have the shape of a trapezium (truncated triangle). Molten metal may be poured into the first mold cavity 14 through the first horizontal open edge 16 and molten metal may be poured into the second mold cavity 18 through the second horizontal open edge 20. An optional well 22 is provided around the first horizontal open edge 16 and the second horizontal open edge 20 to facilitate the pouring of molten metal into the first horizontal open edge 16 and the second horizontal open edge 20.

The first mold cavity 14 has a thickness 24 and the second mold cavity 18 has a thickness 26. Typically, the thicknesses 24 and 26 are each in a range between about 0.005 inches and about 0.2 inches. The first mold cavity 14 and the second mold cavity 18 each have a width 28. Typically, the width 28 is in a range between about four inches to about twelve inches.

The metal casting system 10 includes a first mold backing structure 30, a first mold facing structure 70, and a second mold backing structure 110. A metal band 114 is provided to attach together the first mold backing structure 30, the first mold facing structure 70, and the second mold backing structure 110. The view of the metal casting system 10 in FIG. 1A is taken from the perspective of a corner 126 as shown in FIG. 1B.

Figure 1B:
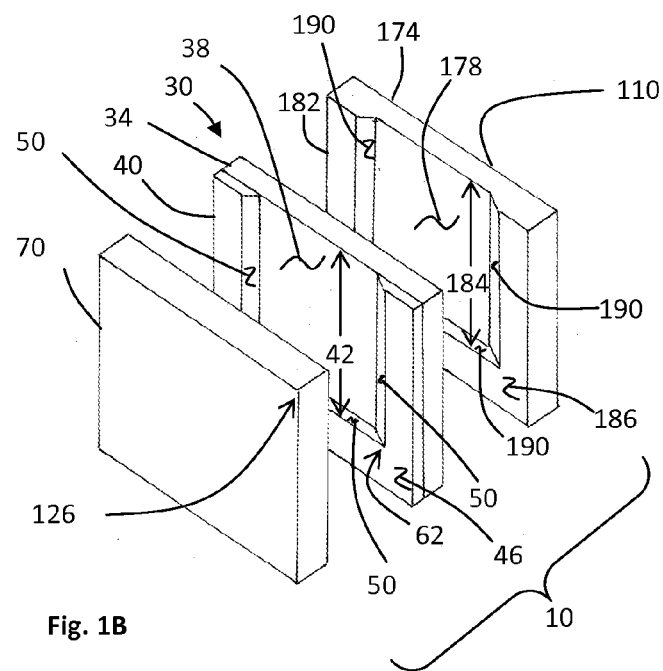
FIG. 1B is an isometric exploded view of elements of the metal casting system of FIG. 1, as seen from a first perspective.

FIG. 1B illustrates an exploded view of certain elements of the metal casting system 10. The first mold backing structure 30 includes a first mold backing structure plate 34. The first mold backing structure plate 34 forms a first mold cavity first planar surface 38. The first mold backing structure 30 also includes a first mold cavity first framing portion 40.

The first mold backing structure 30, the first mold cavity first framing portion 40, the first mold facing structure 70, and the second mold backing structure 110 may be fabricated from stock plate having the required thickness or may be fabricated from sections sliced from a block of material.

In the embodiment depicted in FIGS. 1A and 1B (and 1C), the first mold backing structure plate 34 and the first mold cavity first framing portion 40 are formed as separate removably attachable elements. As used herein, the term "removably attachable" refers to a configuration of elements that are configured both to be held together in contact with each other and to be separated from each other. Various means may be used to configure elements as removably attachable to each other, such as bands (e.g., the band 114 of FIG. 1A), clamps, screws, bolts and nuts, wires, straps, frames, casings, dissolvable adhesives, weights applying sufficient pressure to opposing ends, and similar mechanisms. When a mold backing structure plate (such as the first mold backing structure plate 34) and a mold cavity framing portion (such as the first mold cavity first framing portion 40) are removably attachable to each other, the attachment mechanism used to attach together the first mold backing structure 30, the first mold facing structure 70, and the second mold backing structure 110 is typically also used to attach the mold backing structure plate to the mold cavity framing portion. Forming a mold backing structure plate (e.g., the first mold backing structure plate 34) and a cavity first framing portion (e.g., the first mold cavity first framing portion 40) as separate removably attachable elements may provide some advantages in removing thin plates or sheets that have been cast in a metal casting system. In FIG. 1B, the first mold backing structure plate 34 and the first mold cavity first framing portion 40 are depicted in their attached configuration. The first mold cavity first framing portion 40 has a height 42 that establishes the height of parts cast in the first mold cavity 14. Typically, the height 42 is in a range between about four inches to about twelve inches.

Continuing with FIG. 1B, the first mold cavity first framing portion 40 forms a first mold backing structure first surface 46. The first mold cavity first framing portion 40 also forms a first mold cavity first edge portion 50. In the embodiment of FIG. 1B the first mold cavity first edge portion 50 is a beveled edge. As used herein the term "beveled edge" refers to an edge that is angled at an angle between 120° and 150° with respect to an adjoining surface (for example, in this case, with respect to the first mold cavity first planar surface 38 or with respect to the first mold backing structure first surface 46). The use of a beveled edge in embodiments of casting systems for metal plates provides a significant reduction in alligatoring when such cast plates are processed through a rolling mill. The formation of a beveled edge is not as important when processing cast sheets.

FIG. 1B further illustrates a corner 62 of the first mold cavity first edge portion 50 that is formed as a square corner. In many embodiments a corner of the first mold cavity first edge portion 50 is formed as a rounded corner because it generally reduces machining costs.

Figure 1C:
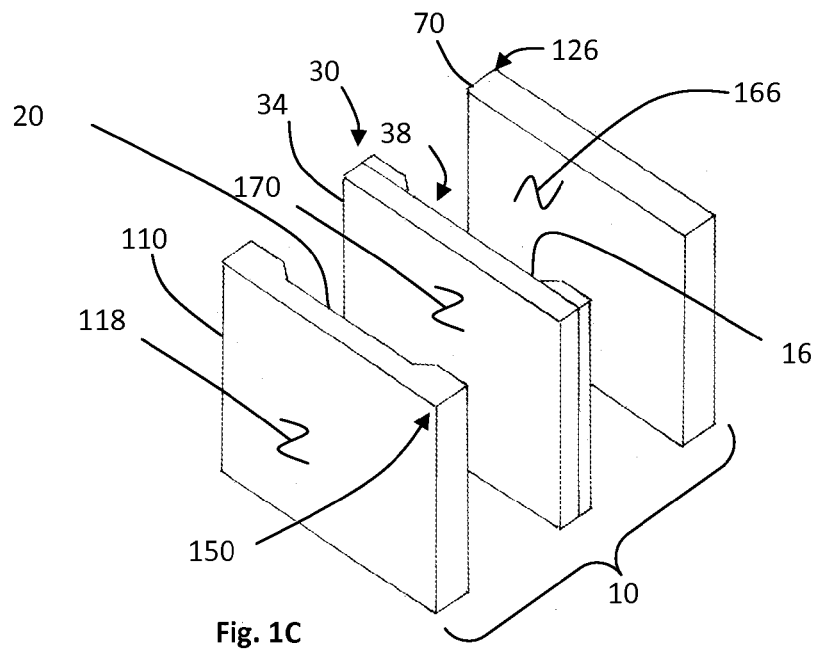
FIG. 1C is an isometric exploded view of elements of the metal casting system of FIG. 1, as seen from a second perspective.

FIG. 1C illustrates the metal casting system 10 as viewed from the perspective of corner 150, which is diagonally opposed from the corner 126. FIG. 1C illustrates that the first mold facing structure 70 has a first mold cavity second planar surface 166. The first mold cavity second planar surface 166 is removably attachable to the first mold backing structure first surface 46 of the first mold cavity first framing portion 40 (depicted in FIG. 1B). When the first mold backing structure first surface 46 is attached to the first mold cavity second planar surface 166, the first mold cavity first planar surface 38, the first mold cavity second planar surface 166, and the first mold cavity first edge portion 50 (depicted in FIG. 1B) form the first mold cavity 14 (FIG. 1A) and the first horizontal open edge 16 (FIGS. 1A and 1C).

FIG. 1C further illustrates that the first mold backing structure plate 34 forms a second mold cavity second planar surface 170 opposing the first mold cavity first planar surface 38. FIG. 1C also identifies a second mold backing surface 118 of the second mold backing structure 110. In some embodiments, the metal casting system 10 employs a second mold facing structure (similar to the first mold facing structure 70) that is disposed adjacent the second mold backing surface 118.

Returning to FIG. 1B, further illustrated are certain details of the second mold backing structure 110. The second mold backing structure 110 includes a second mold backing structure plate 174. The second mold backing structure plate 174 forms a second mold cavity first planar surface 178. The second mold backing structure 110 also includes a second mold cavity first framing portion 182. In certain embodiments, including the embodiment depicted in FIGS. 1A and 1B (and 1C), the second mold backing structure plate 174 and the second mold cavity first framing portion 182 are formed as an integral element. The second mold cavity first framing portion 182 has a height 184 that establishes the height of parts cast in the second mold casting cavity 18. Typically the height 184 is in a range between about four inches to about twelve inches.

As previously noted, the typical width of a casting cavity is about four inches to about twelve inches. With the typical height of a casting cavity being between about four inches and about twelve inches, the typical surface area of a cast part is between about 16 square inches and about 144 square inches. Also, as previously noted, the typical thickness of a casting cavity is between about 0.005 inches and about 0.2 inches. These dimensions establish a "thickness ratio," which is defined as the thickness of a part divided by its surface area. Thus, the thickness ratio of cast parts provided by embodiments disclosed herein may vary between 0.005 in./144 sq. in., which is about 0.000035 in./sq. in., and 0.2 in./16 sq. in., which is about 0.013 in./sq. in. For sheets, which as previously indicated have a thickness that is less than 0.020 inches, the upper limit for the thickness ratio is about 0.020 in/16 sq. in., or about 0.00125 in./sq. in.

The first mold cavity first framing portion 182 forms a second mold backing structure first surface 186 and a second mold cavity first edge portion 190. In the embodiment of FIG. 1B, the second mold cavity first edge portion 190 is a beveled edge. In the embodiment of FIG. 1A, the first horizontal open edge 16 and the second horizontal open edge 20 each have the shape of a truncated triangle. The second mold cavity second flat planar surface 170 is removably attachable to the first mold backing structure first surface 46 (depicted in FIG. 1B). When the second mold backing structure first surface 186 is attached to the second mold cavity second planar surface 170, the second mold cavity first planar surface 178, the second mold cavity second planar surface 170 (FIG. 1C), and the second mold cavity first edge portion 190 form the second mold cavity 18 (FIG. 1A) and the second horizontal open edge 20 (FIGS. 1A and 1C).

Figure 1D:
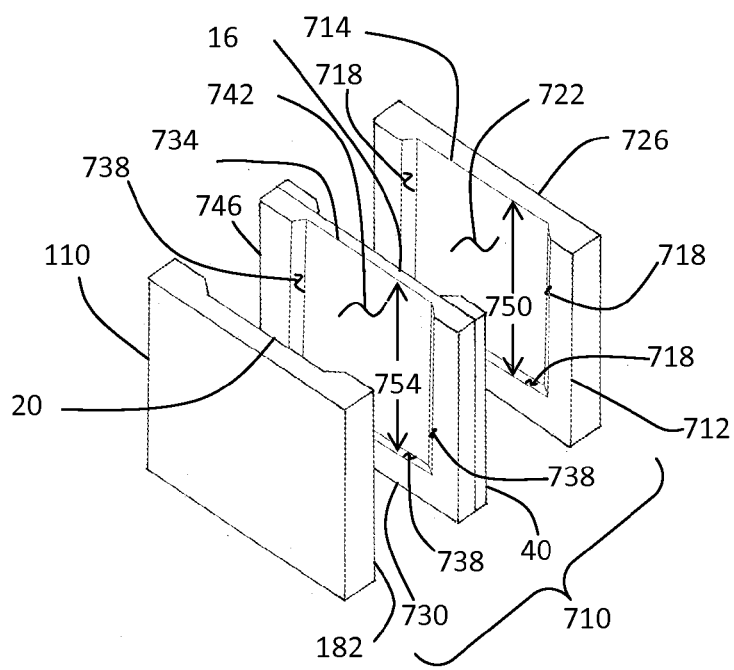
FIG. 1D is an isometric exploded view of elements of a metal casting system.

FIG. 1D illustrates a metal casting system 710 shown from the same perspective point of view as the metal casting system 10 in FIG. 1C. The metal casting system 710 has the second mold backing structure 110 that is used in the metal casting system 10 of FIGS. 1A, 1B, and 1C, including the second horizontal open edge 20 as depicted in FIGS. 1A and 1C and the second mold cavity first framing portion 182 depicted in FIG. 1B. In the metal casting system 710, there is a first mold cavity second framing portion 712 that has a third horizontal open edge 714, a first mold cavity second edge portion 718, and a first mold cavity second planar surface 722 that have been formed in an alternate first mold facing structure 726. Also, in the metal casting system 710 there is a second mold cavity second framing portion 730 that has a fourth horizontal open edge 734, a second mold cavity second edge portion 738, and a second mold cavity second planar surface 742 that have been formed in an alternate first mold backing structure 746. Also formed in the alternate first mold backing structure 746 is the first horizontal open edge 16 depicted in FIGS. 1A and 1C and the first mold cavity first framing portion 40 depicted in FIG. 1A. The first mold cavity first framing portion 40 and the first mold cavity second framing portion 712 each have a height 750 that establishes the height of parts cast in an alternate first mold cavity 758 (depicted in FIG. 1E). The second mold cavity first framing portion 182 and the second mold cavity second framing portion 730 each have a height 754 that establishes the height of parts cast in an alternate second mold cavity 762 (depicted in FIG. 1E). Typically the heights 750 and 754 are in a range between about four inches to about twelve inches.

Figure 1E:
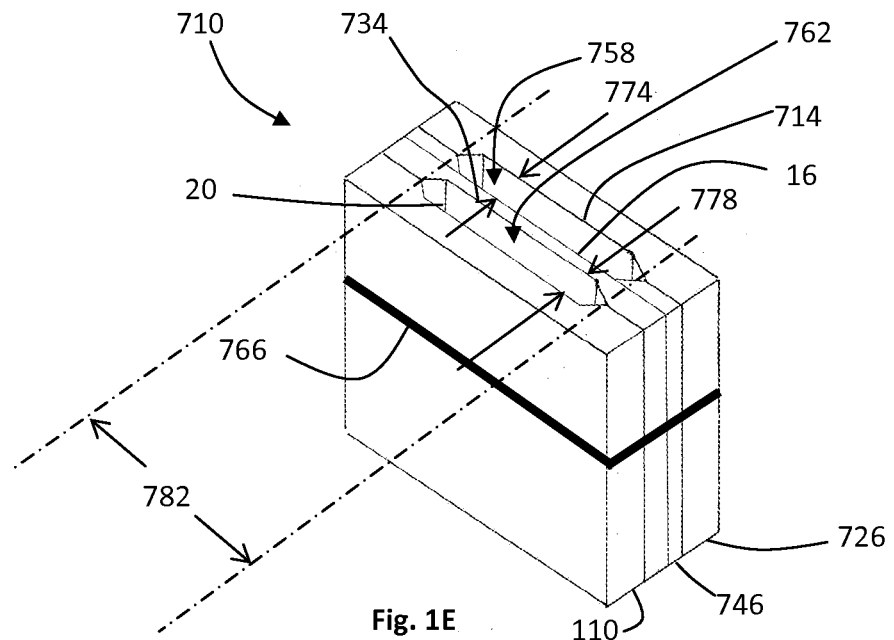
FIG. 1E is an isometric view a metal casting system.

FIG. 1E illustrates the metal casting system 710 assembled together with a metal band 766. The alternate first mold facing structure 726, the alternate first mold backing structure 746 and the second mold backing structure 110 form the alternate first mold cavity 758 and the alternate second mold cavity 762. The alternate first mold cavity 758 has the third horizontal open edge 714 and the alternate second mold cavity 762 has the second horizontal open edge 20 (as also depicted in FIGS. 1A and 1C). In the alternate first mold cavity 758 depicted in FIG. 1E, the third horizontal open edge 714 in combination with the first horizontal open edge 16 forms a first hexagon shape. In the alternate second mold cavity 762, a second hexagon shape is formed by the fourth horizontal open edge 734 in combination with the second horizontal open edge 20. The hexagonal shape is particularly beneficial for reducing alligatoring during rolling operations performed on plates or sheets that have been cast in the metal casting system 710.

The alternate first mold cavity 758 has a thickness 774 and the alternate second mold cavity 762 has a thickness 778. Typically, the thicknesses 774 and 778 are each in a range between about 0.005 inches and about 0.2 inches. The alternate first mold cavity 758 and the alternate second mold cavity 762 each have a width 782. Typically, the width 782 is in a range between about four inches to about twelve inches.

Figure 1F:
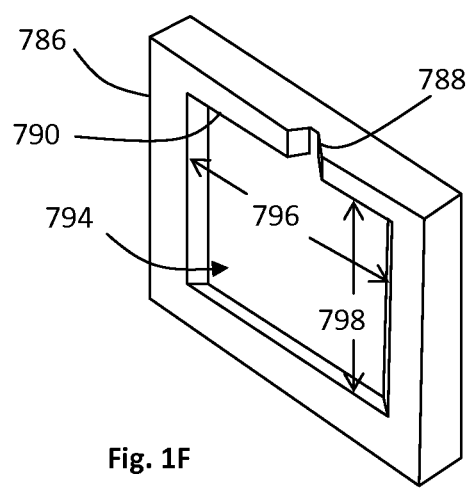
FIG. 1F is an isometric view of a portion of a metal casting system.

FIG. 1F illustrates a modified framing structure portion 786 that has a necked opening 788. In embodiments with a necked opening (e.g., the necked opening 788), a horizontal open edge 790 for providing a flow of a molten metal into a modified mold cavity portion 794 is defined below the necked opening 788. In embodiments with a necked opening, a width 796 that establishes the width of parts cast in the modified framing structure portion 786 is defined below the necked opening (e.g., the necked opening 788). Typically, the width 796 is in a range between about four inches to about twelve inches. The height of parts that are cast in the modified framing structure portion 786 is defined by a height 798 of the modified framing structure portion 786 below the necked opening 788. Typically, the height 798 is in a range between about four inches to about twelve inches.

Figure 2:
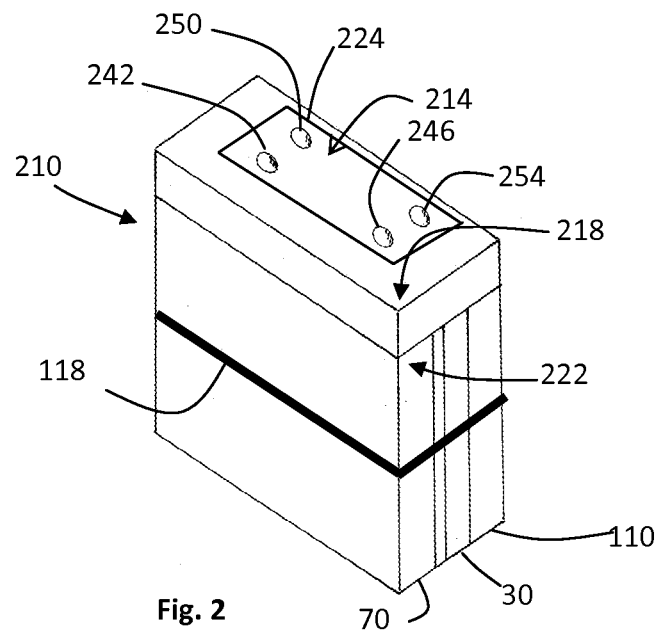
FIG. 2. is an isometric view of a metal casting system.

FIG. 2 illustrates metal casting system 210 that includes the first mold backing structure 30, the first mold facing structure 70, and the second mold backing structure 110 as previously described herein. The metal casting system 210 further includes a distributor 214 that is removably attachable to the first mold backing structure 30, the first mold facing structure 70, and the second mold backing structure 110. The view of the metal casting system 210 in FIG. 2 is taken from the perspective of a corner 218 of the distributor 214, and an adjoining corner 222 of the distributor 214 is also depicted.

Figure 3:
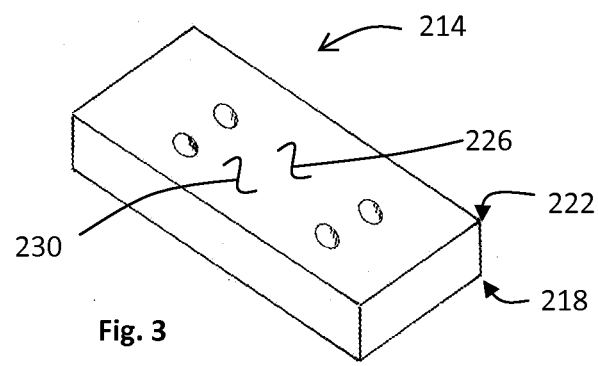
FIG. 3 is an isometric view of a distributor for a metal casting system.

FIG. 3 depicts the distributor 214 in a perspective where it is inverted from the view shown in FIG. 2. When the distributor 214 is attached to the first mold backing structure 30, the first mold facing structure 70, and the second mold backing structure 110, the distributor 214 forms a first mold cavity second edge portion 226 and a second mold cavity second edge portion 230. Thus, in the embodiment of FIG. 2, the first mold cavity first planar surface 38 (FIG. 1B), the first mold cavity first edge portion 50 (FIG. 1B), the first mold cavity second planar surface 166 (FIG. 1C), and the first mold cavity second edge portion 230 (FIG. 3) form a first mold cavity (analogous to the first mold cavity 14 of FIG. 1A with the addition of a top edge). Further, in the embodiment of FIG. 2, the second mold cavity first planar surface 178 (FIG. 1B), the second mold cavity first edge portion 190 (FIG. 1B), the second mold cavity second planar surface 170 (FIG. 1C), and the second mold cavity second edge portion 230 (FIG. 3) form a second mold cavity (analogous to the second mold cavity 18 of FIG. 1A with the addition of a top edge).

Returning to FIG. 2, the distributor 214 has at least one orifice that provides a conduit for flowing molten metal into the first mold cavity 14 and the second mold cavity 18. In preferred embodiments, as shown in FIG. 2, the distributor 214 includes a first vertical feed orifice 242, a second vertical feed orifice 246, a third vertical feed orifice 250, and a fourth vertical feed orifice 254. Feed orifices may be cylindrical, slot-shaped, or formed as openings having other geometries. The first vertical feed orifice 242 and the second vertical feed orifice 246 provide a conduit for flowing molten metal into the first mold cavity 14 (FIG. 1A). The third vertical feed orifice 250 and the fourth vertical feed orifice 254 provide a conduit for flowing molten metal into the second mold cavity 18 (FIG. 1A). The distributor 214 further includes a well 224. The well 224 facilitates the flowing of a molten metal into the first vertical feed orifice 242, the second vertical feed orifice 246, the third vertical feed orifice 250, and the fourth vertical feed orifice 254. Embodiments that employ the distributor 214 with the well 224 typically do not employ the optional well 22 that is depicted in FIG. 1A. The reason that the optional well 22 is not used in such configurations is that using the distributor 214 provides the advantage of reducing the size of the spruest that are connected to molded plates or sheets to just small cylinders, slots, holes, etc. that are formed in the vertical feed orifices (242, 246, 250, and 254). In contrast, if the optional well 22 is used, much larger spruest may be formed in the optional well 22 (and connected to molded plates or sheets). Reducing the size of the sprues to small cylinders also facilitates trimming of the molded plates or sheets to a final shape for subsequent rolling operations.

Figure 4:
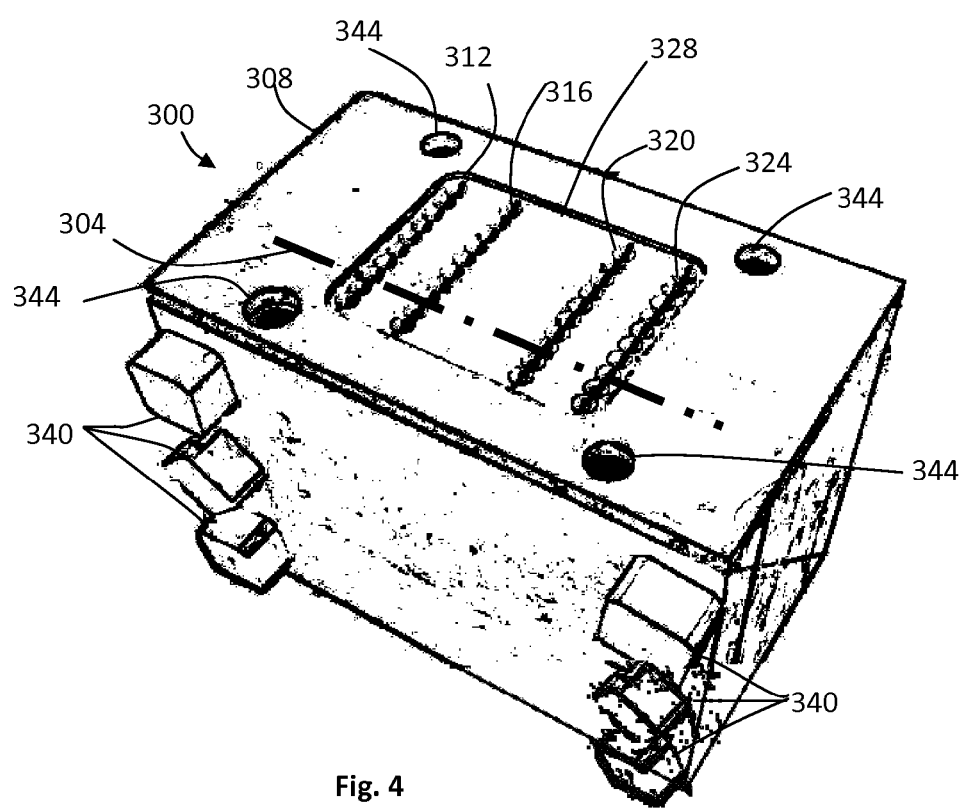
FIG. 4 is a perspective view of a metal casting system.

FIG. 4 illustrates a metal casting system 300. The metal casting system has ten casting cavities, the casting cavities preferably being formed substantially as described above with respect to the mold facing structures and mold backing structures of the embodiments of FIGS. 1A-1F, disposed underneath and parallel to reference line 304. In other embodiments fewer or more than ten casting cavities may be employed. A distributor 308 provides four orifices (such as orifices 312, 316, 320 and 324) for each mold cavity. The orifices (e.g., orifices 312, 316, 320, and 324) have a funnel-shape countersink formed at the top and are disposed in a well 328 in order to facilitate the flow of molten metal through the orifices into the ten casting cavities. Such a countersink is optional. Bolts 340 are provided to attach together the components that define the ten casting cavities, and four holes 344 are provided to secure the distributor 308 to the components that define the ten casting cavities. In some embodiments, two or more cavities may be formed in the same plate. Sometimes the cavities may be front and back instead of all facing the same direction.

In a typical operation, the planar casting surfaces and the edges of the mold cavities are often treated with a mold release material prior to being assembled into a casting system. Such materials as yttrium oxide, aluminum oxide, and erbium oxide, preferably in a finely powdered form, are effective mold release agents for casting uranium and uranium alloys.

Typically, prior to flowing the molten metal into the cavity (ies) of a mold, the mold is preheated to a temperature greater than the melting temperature of the metal that is being cast. In some embodiments, the mold is preheated to a temperature of at least 100° C. greater than the melting temperature of the metal, and in some embodiments the mold is preheated to a temperature of at least 200° C. greater than the melting temperature of the metal.

Often, a crucible is secured to the top of the casting system to provide the source of molten metal into the mold cavities. With such embodiments, a solid metal may be disposed in the crucible, and the crucible with the casting system underneath may then be disposed in a furnace (such as, but not limited to, a microwave casting furnace) where the solid metal melts and flows into the mold cavities. Such configurations provide penetration heating that helps ensure that all mold components sustain heat above the metal melt temperature for a period of time after pouring. Such heating reduces or eliminates porosity, incomplete extensions, and cold shunts. Typically, it is useful to maintain the temperature of the mold with the molten metal in the cavity at a temperature above the melting temperature of the metal (and sometimes to a temperature that is at least 100° C. or at least 200° C. above the melting temperature of the metal) for at least one minute prior to cooling the molten metal to a temperature below the melting temperature of the metal. The higher temperatures (i.e., at least 100° C. or at least 200° C. above the melting temperature) tend to facilitate the flow of the molten metal into the mold cavities. Without being bound by any scientific theory, it is believed that these higher temperatures may either reduce the viscosity of the molten metal or may reduce adherence of the metal to the walls of the cavity, or both. The minimum thickness of a sheet that may be cast may also be dependent upon surface tension properties as a function of temperature. Surface tension of uranium is estimated to be around 1500 dynes/cm at 1200° C. whereas the surface tension of mercury is 478 dynes/cm at 15° C.

Figure 5:
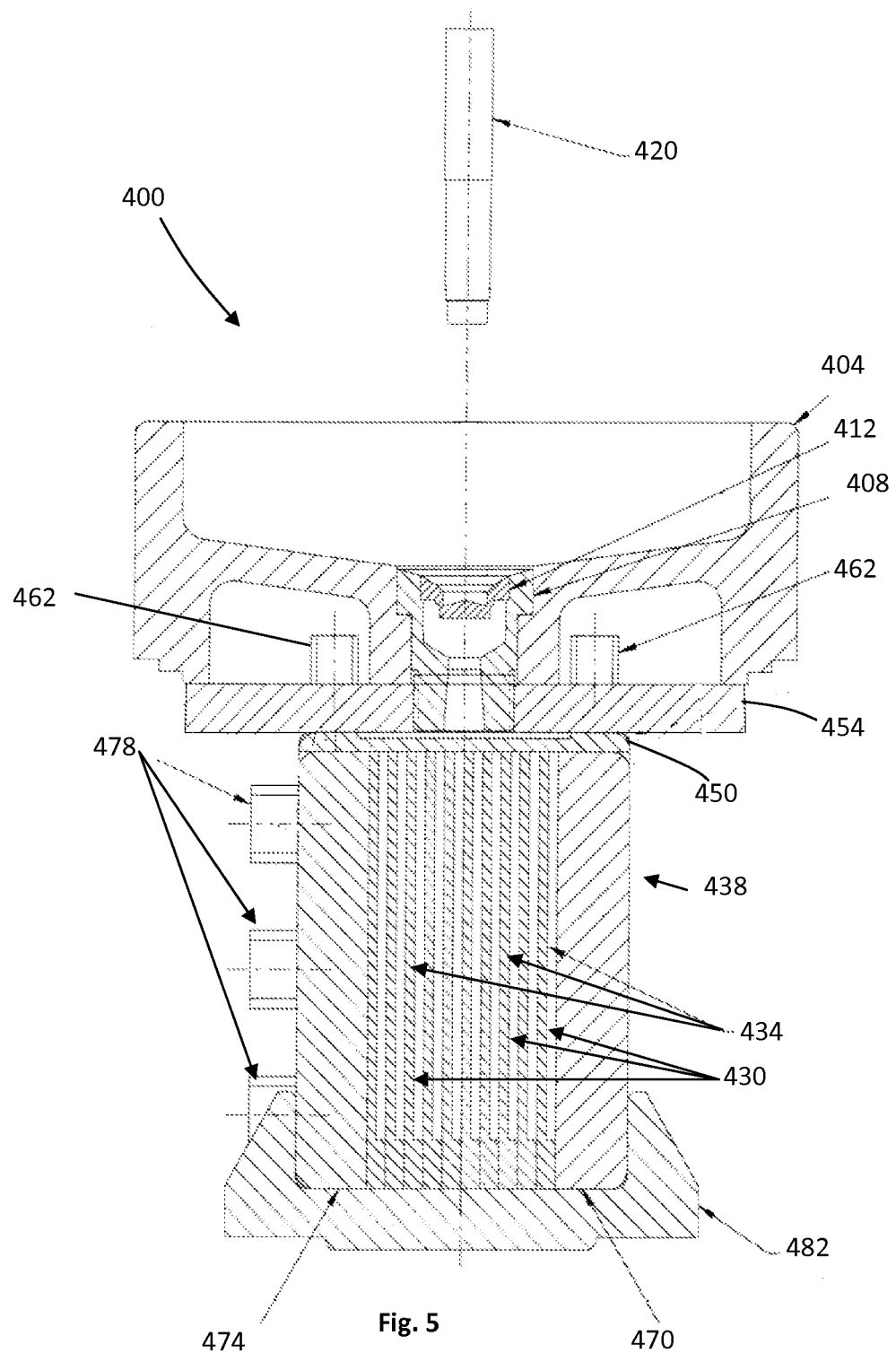
FIGS. 5 and 6 are cross-sectional views of metal casting systems, each with a crucible.

FIG. 5 illustrates an embodiment of a metal casting system 400 that employs a crucible 404. A threaded plug 408 in the bottom of the crucible 404 includes a knockout butterfly plug 412. When a solid metal is entirely melted in the crucible 404, a pour rod 420 is used to break the knockout butterfly plug 412 to flow the molten metal into a plurality of mold cavities 430 that are formed by mold backing structures 434 in a mold 438. This arrangement provides a pressure head of molten metal into the mold cavities 430, which facilitates the complete filling of the mold cavities. FIG. 5 further illustrates that the mold 438 has a distributor 450 for flowing the molten metal into the mold cavities 430. A distributor cap 454 is provided between the crucible 404 and the mold 438. The distributor cap 454 is removably attachable to the distributor 450 by short bolts 462, and the crucible 404 is removably attachable to the distributor cap by the threaded plug 408, which is screwed into the distributor cap 454. The distributor cap 454 provides thermal conductivity between the crucible 404 and the mold 438.

The mold backing structures 434 are disposed between a first mold facing structure 470 and a second mold facing structure 474. Long bolts 478 extending from the second mold facing structure 474 into the first mold facing structure 470 are used in part to hold the first mold facing structure 470, the mold backing structures 434, and the second mold facing structure 474 together. A clamp 482 further holds the first mold facing structure 470, the mold backing structures 434, and the second mold facing structure 474 together.

Figure 6:
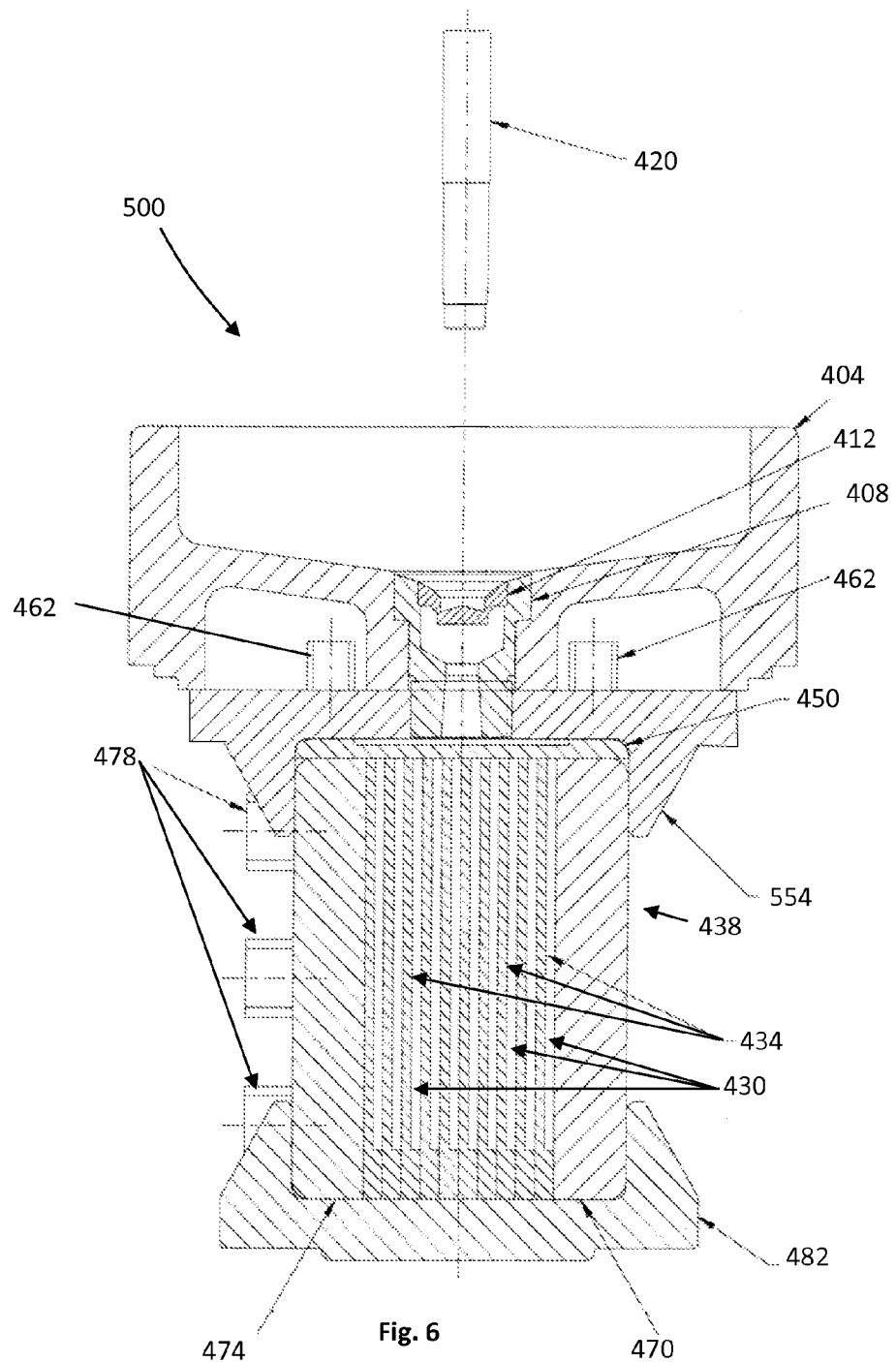

FIG. 6 illustrates an embodiment of a metal casting system 500 that employs many of the same components as the metal casting system 400 of FIG. 5. A difference is that a distributor cap 554 is configured as a clamp to help hold the first mold facing structure 470, the mold backing structures 434, and the second mold facing structure 474 together.

Figure 7:
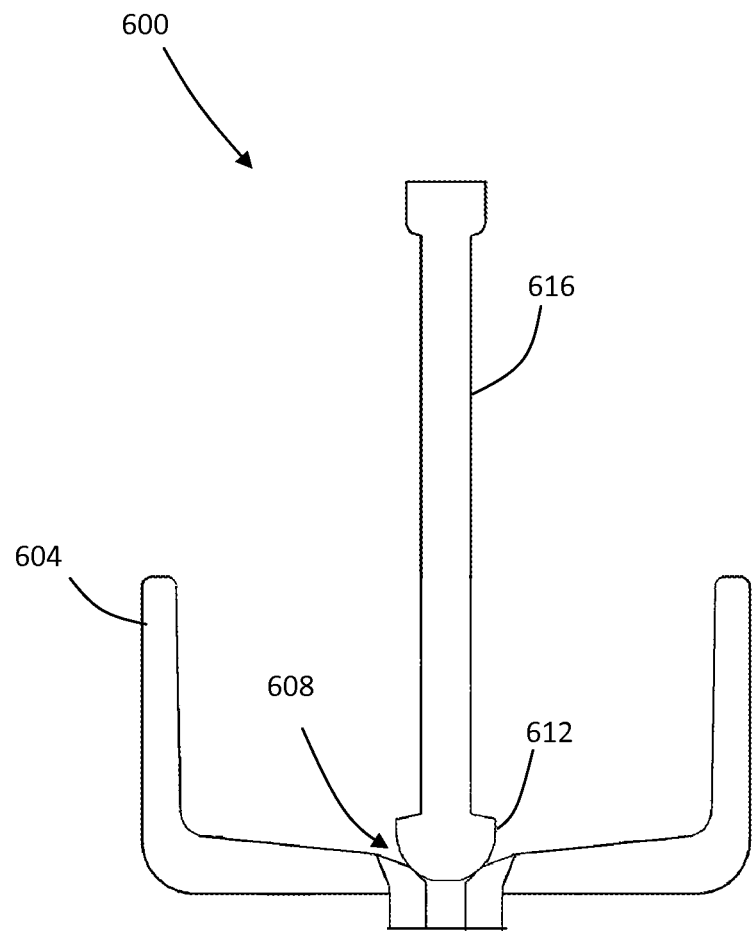
FIG. 7 is a cross-sectional view of a crucible for use in a metal casting system.

FIG. 7 illustrates a crucible 600 that may be used in various embodiments of a metal casting system. The crucible 600 has an opening 608, and a plug portion 612 of a pour rod 616 is disposed in the opening 608. When molten metal is disposed in the crucible 600, the pour rod 616 may be raised vertically to permit the molten metal to pass through the opening 608 into a mold such as the mold 438 depicted in FIGS. 5 and 6.

A further crucible and pouring mechanism that may be used in various embodiments of a metal casting system is described in U.S. Pat. No. 5,286,009—"Device for Controlling the Pouring of Molten Metals," issued Feb. 15 1994 to Moore et al.

Typically, various embodiments described herein are used to cast plates or sheets having a thickness that is in a range from about 0.005 inches to about 0.1 inches. In some embodiments the mold cavities may be of varying thicknesses, heights, and widths to accommodate the casting of comparable plates or sheets in a single pour. Besides the casting of plates or sheets, the casting of rods and objects having a variety of regular or irregular geometries may be accommodated, even in a single pour. In such embodiments the previously described planar surfaces may be replaced with curvilinear planar surfaces or irregular surfaces. Such cast objects may be of near-net (final product) shape.

Various embodiments described herein may be used to fabricate cast metal sheets having a thickness of about 0.005 inches. It was previously unexpected that such paper-thin metal sheets could be formed by a casting process.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A metal casting system comprising:
 a first mold backing structure having a first mold backing structure plate that forms a first mold cavity first planar surface and having a second mold cavity second planar surface opposing the first mold cavity first planar surface, the first mold cavity first planar surface having a first mold cavity first framing portion that forms a first mold backing structure first surface and a first mold cavity first edge portion;
 a second mold backing structure having a second mold backing structure plate that forms a second mold cavity first planar surface and having a second mold cavity first framing portion that forms a second mold backing structure first surface that is removably attachable to the second mold cavity second planar surface and that forms a second mold cavity first edge portion;
 a first mold facing structure having a first mold cavity second planar surface, wherein the first mold backing structure first surface is removably attachable to the first mold cavity second planar surface; and
 a means for removably attaching the first mold backing structure first surface to the first mold cavity second planar surface and for removably attaching the second mold backing structure first surface to the second mold cavity second planar surface wherein, when the first mold backing structure first surface is attached to the first mold cavity second planar surface, the combination of the first mold cavity first planar surface, the first mold cavity second planar surface, and the first mold cavity first edge portion forms a first mold cavity and a first mold cavity first open edge for providing a flow of a molten metal into the first mold cavity, and
 wherein, when the second mold backing structure first surface is attached to the second mold cavity second planar surface, the combination of the second mold cavity first planar surface, the second mold cavity second planar surface, and the second mold cavity first edge portion forms a second mold cavity and a second mold cavity first open edge for providing a second flow of the molten metal into the second mold cavity.

2. The metal casting system of claim 1 wherein the first mold backing structure plate and the first mold cavity first framing portion are formed as separate removably attachable elements and wherein the means for removably attaching the first mold backing structure first surface to the first mold cavity second planar surface further removably attaches the first mold backing structure plate to the first mold cavity first framing portion.

3. The metal casting system of claim 1 wherein the second mold backing structure plate and the second mold cavity first framing portion are formed as separate removably attachable elements and wherein the means for removably attaching the first mold backing structure first surface to the first mold cavity second planar surface further removably attaches the second mold backing structure plate to the second mold cavity first framing portion.

4. The metal casting system of claim 1 wherein at least a portion of both the first mold cavity first edge portion and the second mold cavity first edge portion is a beveled edge.

5. The metal casting system of claim 1 wherein at least a portion of the first mold cavity first edge portion is a beveled edge.

6. The metal casting system of claim 1 wherein:
the first mold cavity second planar surface of the first mold facing structure includes a first mold cavity second framing portion that forms a first mold cavity second edge portion, wherein the first mold backing structure first surface is removably attachable to the first mold cavity second framing portion;
wherein, when the first mold backing structure first surface is attached to the first mold cavity second framing portion, the combination of the first mold cavity first planar surface, the first mold cavity second planar surface, the first mold cavity first edge portion, and the first mold cavity second edge portion forms the first mold cavity, the first mold cavity first open edge, and a first mold cavity second open edge for providing the flow of a molten metal into the first mold cavity.

7. The metal casting system of claim 6 wherein the second mold cavity second planar surface of the first mold backing structure includes a second mold cavity second framing portion that forms a second mold cavity second edge portion,
wherein, when the second mold backing structure first surface is attached to the second mold cavity second framing portion, the combination of the second mold cavity first planar surface, the second mold cavity second planar surface, the second mold cavity first edge portion, and the second mold cavity second edge portion forms the second mold cavity, the second mold cavity first open edge, and a second mold cavity second open edge for providing the second flow of the molten metal into the second mold cavity.

8. A metal casting system comprising:
a first mold backing structure having a first mold backing structure plate that forms a first mold cavity first planar surface and having a first mold cavity first framing portion that forms a first mold backing structure first surface and a first mold cavity first edge portion;
a first mold facing structure having a first mold cavity second planar surface, wherein the first mold backing structure first surface is removably attachable to the first mold cavity second planar surface;
a means for removably attaching the first mold backing structure first surface to the first mold cavity second planar surface wherein, when the first mold backing structure first surface is attached to the first mold cavity second planar surface, the combination of the first mold cavity first planar surface, the first mold cavity second planar surface, and the first mold cavity first edge portion form a first mold cavity and a first open edge for providing a flow of a molten metal into the first mold cavity;
a distributor that is removably attachable to the first mold backing structure and the first mold facing structure;
a second means for removably attaching the distributor to the first mold backing structure and the first mold facing structure wherein, when the first mold backing structure first surface is attached to the first mold cavity second planar surface and when the distributor is attached to the first mold backing structure and the first mold facing structure, the distributor forms a first mold cavity second edge portion, and the first mold cavity first planar surface, the first mold cavity first edge portion, the first mold cavity second planar surface, and the first mold cavity second edge portion form the first mold cavity;
a first vertical feed orifice through the distributor for providing a flow of a molten metal into the first mold cavity;
a distributor cap that is removably attachable to the distributor; and
a crucible that is removably attachable to the distributor cap.

9. The metal casting system of claim 8 wherein the first mold backing structure plate and the first mold cavity first framing portion are formed as separate removably attachable elements and wherein the means for removably attaching the first mold backing structure first surface to the first mold cavity second planar surface further removably attaches the first mold backing structure plate to the first mold cavity first framing portion.

10. The metal casting system of claim 8 wherein at least a portion of the first mold cavity first edge portion includes a first beveled edge.

11. The metal casting system of claim 8 wherein the first mold backing structure has a second mold cavity second planar surface opposing the first mold cavity first planar surface, the metal casting system further comprising:
a second mold backing structure having a second mold backing structure plate that forms a second mold cavity first planar surface and having a second mold cavity first framing portion that forms a second mold backing structure first surface that is removably attachable to the first mold backing structure second surface and that forms a second mold cavity first edge portion, and wherein
the distributor is further removably attachable to the second mold backing structure and when the distributor is attached to the second mold backing structure the distributor forms a second mold cavity second edge portion, wherein the means for removably attaching the first mold backing structure first surface to the first mold cavity second planar surface further removably attaches the second mold backing structure first surface to the first mold backing structure second surface and wherein, when the second mold backing structure first surface is attached to the first mold backing structure second surface and the second mold cavity first planar surface, the combination of the second mold cavity first edge portion, the second mold cavity second planar surface, and the second mold cavity second edge portion form a second mold cavity, and wherein
the distributor further comprises a second vertical feed orifice for providing a second flow of the molten metal into the second mold cavity.

12. The metal casting system of claim 11 wherein the first mold backing structure plate and the first mold cavity first framing portion are formed as separate removably attachable elements and wherein the means for removably attaching the first mold backing structure first surface to the first mold cavity second planar surface further removably attaches the first mold backing structure plate to the first mold cavity first framing portion.

13. The metal casting system of claim 11 wherein at least a portion of the second mold cavity first edge portion includes a second beveled edge.

* * * * *